United States Patent
Tran et al.

(10) Patent No.: US 10,384,958 B2
(45) Date of Patent: Aug. 20, 2019

(54) GLYCERIDES AND FATTY ACID MIXTURES AND METHODS OF USING SAME

(71) Applicant: Ecolab USA Inc., St. Paul, MN (US)

(72) Inventors: Bo L. Tran, Chicago, IL (US); Kerem Eraydin, Blacksburg, VA (US); Jianjun Liu, Aurora, IL (US); Royce D. Mullins, Pound, VA (US); Jinming Zhang, Blacksburg, VA (US); James A. Counter, Thirroul (AU)

(73) Assignee: ECOLAB USA INC., St. Paul, MN (US)

( * ) Notice: Subject to any disclaimer, the term of this patent is extended or adjusted under 35 U.S.C. 154(b) by 1178 days.

(21) Appl. No.: 14/610,095

(22) Filed: Jan. 30, 2015

(65) Prior Publication Data
US 2015/0144570 A1 May 28, 2015

Related U.S. Application Data

(63) Continuation-in-part of application No. 12/982,217, filed on Dec. 30, 2010, now Pat. No. 8,955,685.

(51) Int. Cl.
| | |
|---|---|
| *C02F 1/24* | (2006.01) |
| *C02F 1/54* | (2006.01) |
| *B03D 1/02* | (2006.01) |
| *B03D 1/008* | (2006.01) |
| *C12F 3/10* | (2006.01) |
| *B03D 1/06* | (2006.01) |
| *B03D 1/012* | (2006.01) |

(52) U.S. Cl.
CPC ............... *C02F 1/24* (2013.01); *B03D 1/008* (2013.01); *B03D 1/02* (2013.01); *C12F 3/10* (2013.01); *B03D 1/012* (2013.01); *B03D 1/06* (2013.01); *B03D 2201/02* (2013.01); *B03D 2201/04* (2013.01); *B03D 2203/08* (2013.01); *C02F 1/54* (2013.01)

(58) Field of Classification Search
CPC ...... B03D 1/02; B03D 1/008; B03D 2203/08; B03D 2201/02; B03D 2201/04; C02F 1/24; C12F 3/10
USPC .......................... 209/166; 210/705, 727, 728
See application file for complete search history.

(56) References Cited

U.S. PATENT DOCUMENTS

| | | | |
|---|---|---|---|
| 2,014,406 A | 9/1935 | Weed et al. | |
| 2,838,369 A * | 6/1958 | Gaudin | B03D 1/008 209/166 |
| 4,210,531 A * | 7/1980 | Wang | C02F 1/54 209/5 |
| 4,710,361 A * | 12/1987 | Ostrea | B03D 1/008 209/166 |
| 6,375,853 B1 | 4/2002 | Yoon | |
| 6,827,220 B1 * | 12/2004 | Young | B03D 1/006 209/166 |
| 7,398,935 B2 | 7/2008 | Tran | |
| 7,497,955 B2 | 3/2009 | Scheimann | |
| 7,553,984 B2 | 6/2009 | Rau et al. | |
| 7,566,469 B2 | 7/2009 | Scheimann | |
| 7,624,878 B2 | 12/2009 | Tran | |
| 7,837,891 B2 | 11/2010 | Tran | |
| 8,093,303 B2 | 1/2012 | Hovland et al. | |
| 8,123,042 B2 | 2/2012 | Tran | |
| 8,413,816 B2 | 4/2013 | Child | |
| 8,469,197 B2 | 6/2013 | Gupta et al. | |
| 2006/0037890 A1 | 2/2006 | Rautiola | |
| 2007/0181467 A1 | 8/2007 | Rau et al. | |
| 2007/0187300 A1 | 8/2007 | Tran | |
| 2007/0187301 A1 | 8/2007 | Tran et al. | |
| 2008/0005956 A1 | 1/2008 | Tran | |
| 2008/0115409 A1 | 5/2008 | Tran | |
| 2008/0190160 A1 | 8/2008 | Tran | |
| 2008/0308467 A1 | 12/2008 | Tran | |
| 2009/0008301 A1 | 1/2009 | Yoon | |
| 2010/0181520 A1 | 7/2010 | Gupta et al. | |
| 2010/0252487 A1 | 10/2010 | Tran | |
| 2011/0009534 A1 | 1/2011 | Hovland et al. | |
| 2011/0198296 A1 | 8/2011 | Child | |
| 2012/0145605 A1 * | 6/2012 | Greene | B03D 1/008 209/166 |

FOREIGN PATENT DOCUMENTS

WO WO 2007/098115 8/2007

OTHER PUBLICATIONS

Winkler-Moser, Jill K. and L. Breyer, "Composition and oxidative stability of crude oil extracts of corn germ and distillers grains." Industrial Crops and Products (2011), vol. 33, No. 3, pp. 572-578.
Moreau, Robert et al. "The Composition of Crude Corn Oil Recovered after Fermentation via Centrifugation from a Commercial Dry Grind Ethanol Process," Journal of the American Oil Chemists Society, vol. 87, No. 8 (2010), pp. 895-902.
Liu, et al., "Composition and Method for Improvement in Froth Flotation", U.S. Appl. No. 13/687,042, filed Nov. 28, 2012.
Aranda "A Brazilian Perspective on Bioenergy Issues—Future of Forest Bioenergy," GreenTec, Stockholm, 2007, www.greentec-ufrj.com.

* cited by examiner

*Primary Examiner* — Thomas M Lithgow
(74) *Attorney, Agent, or Firm* — Eric D. Babych; Brinks Gilson & Lione

(57) ABSTRACT

The invention provides methods and compositions for green compositions and technologies. In an embodiment, the present invention provides a method of separating a first material from a second material. For example, the method can comprise mixing the first material and the second material in a slurry with a beneficiation composition. The beneficiation composition can comprise one or more glyceride and fatty acid mixtures extracted from a fuel ethanol process. Air bubbles can be provided in the slurry to form bubble-particle aggregates with the first material and the bubble-particle aggregates can be allowed to be separated from the second material.

5 Claims, No Drawings

GLYCERIDES AND FATTY ACID MIXTURES AND METHODS OF USING SAME

CROSS-REFERENCE TO RELATED APPLICATIONS

This application is a continuation-in-part application of US Patent Application 12/982,217 filed on Dec. 30, 2010 and issued as U.S. Patent No. 8,955.685 on Feb. 17. 2015.

STATEMENT REGARDING FEDERALLY SPONSORED RESEARCH OR DEVELOPMENT

Not Applicable.

BACKGROUND OF THE INVENTION

The present invention relates generally to green compositions and technologies. More specifically, the present invention relates to compositions, methods, and apparatuses of/for glycerides and fatty acid mixtures derived from ethanol processes as co-products or by-products. These compositions can be applied in numerous applications. One application is beneficiation, that is a method of separating useful matter from waste. Another application is dewatering, separating water from a material. Other applications are selected from a list comprising of lubrication fluid, rolling oil, hydraulic fluids, antifoams, defoamers, drilling fluid, coating oil, fire-resistance fluid, and dust control. In a beneficiation process, two or more materials which coexist in a mixture (the fines) are separated from each other using chemical and/or mechanical processes. Often one of the materials (the beneficiary) is more valuable or desired than the other material (the gangue).

As described for example in U.S. Pat. Nos. 4,756,823, 5,304,317, 5,379,902, 7,553,984, 6,827,220, 8,093,303, 8,123,042, and in Published U.S. Patent Applications 2010/0181520 A1 and 2011/0198296, and U.S. patent application Ser. No. 13/687,042, one form of beneficiation is froth flotation separation. Commonly, flotation uses the difference in the hydrophobicity of the respective components. The components are introduced into the flotation apparatus sparged with air, to form bubbles. The hydrophobic particles preferentially attach to the bubbles, buoying them to the top of the apparatus. The floated particles (the concentrate) are collected, dewatered and accumulated. The less hydrophobic particles (the tailings) tend to migrate to the bottom of the apparatus from where they can be removed.

Two common forms of flotation separation processes are direct flotation and reverse flotation. In direct flotation processes, the concentrate is the beneficiary and the tailings are the gangue. In reverse flotation processes, the gangue constituent is floated into the concentrate and the beneficiary remains behind in the slurry. The object of flotation is to separate and recover as much of the valuable constituent(s) of the fine as possible in as high a concentration as possible which is then made available for further downstream processing steps.

Froth flotation separation can be used to separate solids from solids (such as the constituents of mine ore) or liquids from solids or from other liquids (such as the separation of bitumen from oil sands). When used on solids, froth separation also often includes having the solids comminuted (ground up by such techniques as dry-grinding, wet-grinding, and the like). After the solids have been comminuted they are more readily dispersed in the slurry and the small solid hydrophobic particles can more readily adhere to the sparge bubbles. There are a number of additives that can be added to increase the efficiency of a froth flotation separation. Collectors are additives which adhere to the surface of concentrate particles and enhance their overall hydrophobicity. Gas bubbles then preferentially adhere to the hydrophobized concentrate and it is more readily removed from the slurry than are other constituents, which are less hydrophobic or are hydrophilic. As a result, the collector efficiently pulls particular constituents out of the slurry while the remaining tailings which are not modified by the collector, remain in the slurry. Examples of collectors include oily products such as fuel oil, tar oil, animal oil, vegetable oil, fatty acids, fatty amines, and hydrophobic polymers. Other additives include frothing agents, promoters, regulators, modifiers, depressors (deactivators) and/or activators, which enhance the selectivity of the flotation step and facilitate the removal of the concentrate from the slurry.

The performance of collectors can be enhanced by the use of modifiers. Modifiers may either increase the adsorption of collector onto a given mineral (promoters), or prevent collector from adsorbing onto a mineral (depressants). Promoters are a wide variety of chemicals which in one or more ways enhance the effectiveness of collectors. One way promoters work is by enhancing the dispersion of the collector within the slurry. Another way is by increasing the adhesive force between the concentrate and the bubbles. A third way is by increasing the selectivity of what adheres to the bubbles. This can be achieved by increasing the hydrophilic properties of materials selected to remain within the slurry, these are commonly referred to as depressants.

Frothing agents or frothers are chemicals added to the process which have the ability to change the surface tension of a liquid such that the properties of the sparging bubbles are modified. Frothers may act to stabilize air bubbles so that they will remain well-dispersed in slurry, and will form a stable froth layer that can be removed before the bubbles burst. Ideally the frother should not enhance the flotation of unwanted material and the froth should have the tendency to break down when removed from the flotation apparatus. Collectors are typically added before frothers and they both need to be such that they do not chemically interfere with each other. Commonly used frothers include pine oil, aliphatic alcohols such as MIBC (methyl isobutyl carbinol), polyglycols, polygloycol ethers, polypropylene glycol ethers, polyoxyparafins, cresylic acid (Xylenol), commercially available alcohol blends such as those produced from the production of 2-ethylhexanol and any combination thereof.

Unfortunately many of the additives are expensive and/or toxic thereby reducing the cost-effectiveness of the beneficiation processes. Diesel, a petroleum fuel, is a common beneficiation composition; it is toxic and derived from non-renewable resource. The present invention is non-hazardous and is derived from renewable resources; it can be used to replace diesel.

It is therefore desirable to provide and utilize cost-effective, non-hazardous, and effective beneficiation compositions.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

To satisfy the long-felt but unsolved needs identified above, at least one embodiment of the invention is directed towards green compositions and methods of using same.

At least one embodiment is a method of separating a first material from a second material. For example, the method can comprise mixing the first material and the second material in a slurry with a beneficiation composition. The beneficiation composition can comprise one or more glycerides and fatty acid mixtures derived from an ethanol process. Air bubbles can be provided in the slurry to form bubble-particle aggregates with the first material and the bubble-particle aggregates can be allowed to be separated from the second material.

In at least one embodiment the glycerides and fatty acid mixtures are generated from an ethanol process. In an ethanol process, the extraction of the glycerides and fatty acid mixtures can be referred to as corn oil extraction. One method of extracting corn oil is through recovery from the stillage and/or the distillers grains and solubles produced by a dry corn ethanol plant. In an embodiment, the glycerides and fatty acid mixtures contains about 5 to 25 weight percent fatty acids. Linoleic acid is typically the predominant fatty acid. The glycerides and fatty acid mixtures can contain other components that include phytosterols, hydroxycinnamate, steryl esters, lutein, and zeaxanthin.

In at least one embodiment, the glyceride and fatty acid mixtures are extracted from an ethanol process.

In at least one embodiment, the composition and/or the glyceride and fatty acid mixtures contain linoleic acid.

At least one embodiment is a method of separating hydrophobic and hydrophilic particles in an aqueous slurry. For example, the method can comprise adding a beneficiation composition to the aqueous slurry to increase the hydrophobicity of the hydrophobic particles. The beneficiation composition may comprise glycerides and fatty acid mixtures. The aqueous slurry may be mixed to assist the glycerides and fatty acid mixtures to adsorb onto the surface of the hydrophobic particles so as to increase the hydrophobicity of the hydrophobic particles. Air bubbles may be provided to the aqueous slurry so that the hydrophobic particles collect on the surface of the air bubbles forming bubble-particle aggregates. The bubble-particle aggregates may be allowed to float to the surface of the aqueous slurry to be separated from the hydrophilic particles.

In at least one embodiment, the present invention provides a beneficiation composition comprising one or more glycerides and fatty acid mixtures derived from an ethanol manufacturing process. In an embodiment the ethanol process is a fuel ethanol process. In an embodiment the ethanol process is a food or beverage ethanol process.

An advantage of the present invention is to provide cost-effective methods of separating two or more materials.

Another advantage of the present invention is to provide hydrophobicity enhancing compositions that can be used in flotation processes that have improved cost-savings.

Additional features and advantages are described herein, and will be apparent from, the following Detailed Description.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Collector" means a composition of matter that selectively adheres to a particular constituent of the fine and facilitates the adhesion of the particular constituent to the micro-bubbles that result from the sparging of a fine bearing slurry.

"Comminuted" means powdered, pulverized, ground, or otherwise rendered into fine solid particles.

"Concentrate" means the portion of fine which is separated from the slurry by flotation and collected within the froth layer.

"Consisting Essentially of" means that the methods and compositions may include additional steps, components, ingredients or the like, but only if the additional steps, components and/or ingredients do not materially alter the basic and novel characteristics of the claimed methods and compositions.

"Fine" means a composition of matter containing a mixture of a more wanted material, the beneficiary and a less wanted material, the gangue.

"Frother" or "Frothing Agent" means a composition of matter that enhances the formation of the micro-bubbles and/or preserves the formed micro-bubbles bearing the hydrophobic fraction that result from the sparging of slurry.

"Microemulsion" means a dispersion comprising a continuous phase material, substantially uniformly dispersed within which are droplets of a dispersed phase material, the droplets are sized in the range of approximately from 1 to 100 nm, usually 10 to 50 nm.

"Separation" means a mass transfer process that converts a mixture of substances into two or more distinct product mixtures, at least one of which is enriched in one or more of the mixture's constituents, it includes but is not limited to such processes as: Adsorption, Centrifugation, cyclonic separation, density based separation, Chromatography, Crystallization, Decantation, Distillation, Drying, Electrophoresis, Elutriation, Evaporation, Extraction, Leaching extraction, Liquid-liquid extraction, Solid phase extraction, Flotation, Dissolved air flotation, Froth flotation, Flocculation, Filtration, Mesh filtration, membrane filtration, microfiltration, ultrafiltration, nanofiltration, reverse osmosis, Fractional distillation, Fractional freezing, Magnetic separation, Precipitation, Recrystallization, Sedimentation, Gravity separation, Sieving, Stripping, Sublimation, Vapor-liquid separation, Winnowing, Zone refining, and any combination thereof.

"Slurry" means a mixture comprising a liquid medium within which fines (which can be liquid and/or finely divided solids) are dispersed or suspended, when slurry is sparged, the tailings remain in the slurry and at least some of the concentrate adheres to the sparge bubbles and rises up out of the slurry into a froth layer above the slurry, the liquid medium may be entirely water, partially water, or may not contain any water at all.

"Stable Emulsion" means an emulsion in which droplets of a material dispersed in a carrier fluid that would otherwise merge to form two or more phase layers are repelled from each other, the repulsion may have a half-life of a few years. Enabling descriptions of emulsions and stable emulsions are stated in general in *Kirk-Othmer, Encyclopedia of Chemical Technology*, Fourth Edition, volume 9, and in particular on pages 397-403 and *Emulsions: Theory and Practice, 3rd* Edition, by Paul Becher, Oxford University Press, (2001).

"Surfactant" and "Co-surfactant" is a broad term which includes anionic, nonionic, cationic, and zwitterionic surfactants, a co-surfactant is an additional one or more surfactants present with a first distinct surfactant that acts in addition to the first surfactant, to reduce or further reduce the surface tension of a liquid. Further enabling descriptions of surfactants and co-surfactants are stated in *Kirk-Othmer, Encyclopedia of Chemical Technology*, Third Edition, volume 8, pages 900-912, and in *McCutcheon's Emulsifiers and Detergents*, both of which are incorporated herein by reference.

"Sparging" means the introduction of gas into a liquid for the purpose of creating a plurality of bubbles that migrate up the liquid.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims. All illustrated chemical structures also include all possible stereoisomer alternatives.

At least one embodiment of the invention is directed towards a beneficiation process in which a composition is added to the slurry, the composition comprises an extract from an ethanol process. The extract may comprise glycerides and fatty acid mixtures.

At least one embodiment invention is one or more methods and/or compositions described in co-pending U.S. patent application Ser. No. 12/982,217 filed on Dec. 30, 2010.

In at least one embodiment the composition not only enhances the recovery of concentrate but it increases the selectivity of the fine, increasing the proportion of beneficiary and reducing the proportion of gangue in the concentrate.

In the present specification, the term "glycerides and fatty acid mixtures" should be understood to mean mixtures extracted from an ethanol process.

In an embodiment, the present invention provides beneficiation compositions comprising glycerides and fatty acid mixtures. The glycerides and fatty acid mixtures can comprise linoleic acids and one or more components selected from a list comprising of phytosterols, hydroxycinnamate, steryl esters, lutein, and zeaxantrhin.

The glycerides and fatty acid mixtures (GFA) of the present invention were surprisingly found to be effective as reagents for use in beneficiation technologies such as, for example, flotation processes. In addition, these glycerides and fatty acid mixtures are generally environmentally benign and non-hazardous. The glycerides and fatty acid mixtures are also non-combustible and can provide benefits in applications where there is a "high" flash point requirement. The by-products can be used to supplement or replace conventional hazardous collectors for flotation processes such as diesel fuel thereby reducing the dependency on such environmentally unfriendly materials. Diesel fuel is used ubiquitously in the mineral processing industry. A good portion of the spent diesel from the processes is injected underground posing an environmental and human health hazard. The present invention offers an added benefit of not posing any environmental and/or human health hazard if discharged underground.

Glycerides and fatty acid mixtures are co-products or by-products of an ethanol process. They are considered green compositions because they are non-hazardous and are derived from natural, renewable resources. These renewable resources include corn.

Ethanol can be derived from corn utilizing a dry milling process, where the entire corn kennel is ground into flour, and mixed with water. Enzymes are added to convert the starch to sugar. Yeast is then added to convert the sugar to ethanol. The solution, commonly referred to as wash, meal, beer mash or sour mash, is then distilled separating the ethanol from the remaining portion or stillage, commonly referred to as the whole stillage, thick stillage, or thick slop. The nonfermentable parts are separated. The solids are combined into feed co-product called distillers dried grain with solubles (DDGS). The liquid portion, which can contain some solids, is referred to as the thin stillage. Glyceride and fatty acid mixtures can be extracted from the thin stillage and/or the DDGS.

U.S. Published Patent Application 2009/0008301 teaches hydrophobicity enhancing reagents employing naturally occurring lipids. It mentions that triacylglycerols can be readily hydrolyzed to fatty acids. And vegetable oils are produced by solvent extraction; some of the impurities in the crude oil, such as free fatty acids and phospholipids, are removed from crude vegetable oils by alkali refining and precipitation. It however does not teach glycerides and fatty acid mixtures derived from an ethanol process.

In at least one embodiment the invention differs from the commercial vegetable oils. The commercial vegetable oils are refined, bleached and deodorized (RBD) and the composition is not.

U.S. Pat. Nos. 7,497,955 and 7,566,469 both teach dewatering methods of stillage from an ethanol process utilizing polymers. U.S. Pat. No. 7,497,955 teaches improve efficiency in removal of oil from the thin stillage. It mentions the oil in the stillage is of concern as it is carried through the process. Hence, GFA can be extracted from different phases of the ethanol process. The presence of the oil fraction in the stillage is derived from the germ of the corn kernel which is not removed or recovered in corn dry milling operations. U.S. Pat. No. 7,497,955 teaches improving the capture efficiency of the oil from several streams of the ethanol process.

U.S. Pat. No. 7,566,469 discusses the dry milling process of making both food and fuel grade ethanol from corn. Ethanol is retrieved from the beer mash in a stripper column. It teaches a method of dewatering corn stillage solids.

In at least one embodiment glycerides and fatty acid mixtures are derived as a by-product from an ethanol process. As described in the article: *The Composition of Crude Corn Oil Recovered after Fermentation via Centrifugation from a Commercial Dry Grind Ethanol Process*, by Moreau, Robert A. et al., Journal of the American Oil Chemists' Society 2010 Aug., v. 87, no. 8, pp. 895-902, Springer-Verlag (2010), the present invention composition differs significantly from commercial corn oil. The levels of free fatty acids in the post fermentation corn oil are higher. The levels of free phytosterols and hydroxycinnamate steryl esters are also higher than commercial oil. Levels of hydroxycinnamate ranged about 0.3 to 0.5 weight percent. While levels of hydroxycinnamate in commercial oil was non-detected. Exposure to all upstream processes of a fuel ethanol plant, including high-temperature liquefaction, saccharification, and fermentation appeared to have lowered the levels of tocopherols. Tocopherols in commercial vegetable oil that is unrefined were reported to be about 319 mg per 100 g of oil. Tocopherols in the present invention averaged about 100 mg per 100 g of oil.

Recent federal ruling mandates 15 billion gallons of corn base ethanol by 2022. EPA recognized extraction of the glycerides and fatty acid stream from a fuel ethanol processes is beneficial in terms of ethanol process improvements and lowering green house gas emissions from a holistic ethanol life cycle perspective. One benefit is utilizing the glycerides and fatty acid mixtures as a feedstock to make biodiesel. It is estimated that 0.5 pound to 1.4 pound of glycerides and fatty acid mixtures can be derived from a bushel of corn used for ethanol production.

In at least one embodiment, the present invention provides methods of enhancing the hydrophobicity of compounds in certain beneficiation processes. For example, the beneficiation compositions comprising the glycerides and fatty acid mixtures can be useful in beneficiation of the following materials including, but not limited to, the group of coal, plastics, sand and gravel, phosphates, diamonds, and other mineral ores or man-made matter.

In at least one embodiment, the beneficiation compositions is used in processes to increase the hydrophobicity of particulate materials, particularly in applications such as flotation resulting in the beneficiation of coal, phosphates, diamond ore, and the like. The beneficiation compositions may be used in conjunction with other suitable flotation collectors and promoters.

Flotation processes are one of the most widely used methods of separating the valuable material from valueless material present, for example, in particulates or fines. For example, in this process, the fine particles are dispersed in water or other suitable solution and small air bubbles are introduced to the slurry so that hydrophobic particles can be selectively collected on the surface of the air bubbles and exit the slurry (e.g. by rising to the surface) while hydrophilic particles are left behind. The hydrophilic particles can also sink to the bottom of the slurry to be collected as a sludge.

The glycerides and fatty acid mixtures can be used to separate materials, for example, in any suitable flotation process. It should be appreciated that the desired final products can rise to the surface during flotation and/or sink to the bottom, such as in reverse flotation processes. For example, during silica flotation processes, the desired product can sink to the bottom of the slurry and the waste product can rise to the top of the slurry.

In at least one embodiment, the present invention provides a method of separating a first material from a second material. For example, the method can comprise mixing the first material and the second material in a slurry with a beneficiation composition. The first material can be water; the second material is being dewatered. The dewatering composition can comprise one or more glycerides and fatty acid mixtures.

The release of water from particle surfaces may be governed by the surface tension of the water. Surface tension is a physical property of water that can be defined ass resistance to flow when a force is applied. The surface tension of the water can be reduced by the addition of various surfactant chemistries known as dewatering aids. The present invention provides methods and compositions of using glycerides and fatty acids extracted from an ethanol process as a dewater aid.

At least one embodiment may help to create a hydrophobic surface. Water droplets on this surface tend to stand up so the area of adhesion is minimized and the water is more easily removed from the hydrophobic surface. The angle the water droplet makes with the hydrophobic surface is sharper, or steeper.

In at least one embodiment the composition/glycerides and fatty acid mixtures is applied as an emulsion. Emulsions of the glyceride and fatty acid mixtures can help to disperse the mixtures, obtaining similar performance at less active concentration. The emulsion can contain an emulsion stabilizing reagent.

The materials to be separated may have any suitable size. By example and not limitation, the materials may range from 2 mm to 0.1 mm in size. The slurry can also have up to 50% solids. Any suitable mechanical or chemical forces can be used to bring the slurry particles in contact with the beneficiation compositions of the present invention. The floated product and the non-floated tailings can be collected from the present methods.

In at least one embodiment the method may further comprise one or more additional separation methods prior to and/or subsequent to the beneficiation step.

In at least one embodiment the composition is applied to anyone or more of the following processes: beneficiation of ore containing: copper, gold, silver, iron, lead, nickel, cobalt, platinum, zinc, coal, barite, calamine, fledspar, fluorite, heavy metal oxides, talc, potash, phosphate, iron, graphite, kaolin clay, bauxite, pyrite, mica, quartz, and any combination thereof, sulfide ores including but not limited to copper, gold and silver, iron, lead, nickel and cobalt, platinum, zinc, complex sulfide ores such as but not limited to copper-lead-zinc, non-sulfide ores such as coal, barite, calamine, fledspar, fluorite, heavy metal oxides, talc, potash, phosphate, iron, graphite and kaolin clay, and any combination thereof.

The composition may be used along with or in the absence of a frother. It may be added to the slurry before, after, or simultaneous to the addition of a frother. It may be added before during or after sparging and/or beneficiation has begun. The composition may be used with or in the absence of any frother in any flotation process.

Representative examples of collectors and methods of their use are described in and may comprise at least one of the collector compositions and/or other compositions described in scientific papers: *Application research on emulsive collector for coal flotation*, by C. L. Han et al., Xuanmei Jishu, vol. 3 pages 4-6 (2005), *The use of reagents in coal flotation*, by J. S. Laskowski, Proceedings of the UBC-McGill Bi-Annual International Symposium on Fundamentals of Mineral Processing, Vancouver, BC, CIMM, Aug, 20-24 (1995), *Effect of collector emulsification on coal flotation kinetics and on recovery of different particle sizes*, by A. M. Saleh, Mineral Processing on the verge of the 21st Century, Proceedings of the International Mineral Processing Symposium, 8th, Antalya, Turkey, Oct. 16-18, 2000, pp. 391-396 (2000), *Application of novel emulsified flotation reagent in coal slime flotation*, by W. W. Xie, Xuanmei Jishu vol. 2 pp. 13-15 (2007), *A study of surfactant/oil emulsions for fine coal flotation*, by Q. Yu et al., Advance in Fine Particle Processing, Proc. Int. Symp. pp. 345-355, (1990), *Evaluation of new emulsified floatation reagent for coal*, by S. Q. Zhu, Science Press Beijing, vol. 2 pp. 1943-1950 (2008), *Study on flotation properties of emulsified diesel oil*, by W. Xie et al, Energy Procedia Vol. 14, pp. 750-755 (2012), and Chinese Patent Documents CN 101940981 A 20110112 and CN 85106071 A 19860110.

In at least one embodiment at least part of the collector is at least one item selected from the list consisting of: fatty acids, neutralized fatty acids, fatty acid esters, soaps, amine compounds, petroleum-based oily compounds (such as diesel fuels, decant oils, and light cycle oils, kerosene or fuel oils), organic type collector, and any combination thereof.

In at least one embodiment the organic type collector is a sulfur containing material which includes such items as xanthates, xanthogen formates, thionocarbamates, dithiophosphates (including sodium, zinc and other salts of dithiophosphates), and mercaptans (including mercaptobenzothiazole), ethyl octylsulfide, and any combination thereof.

In at least one embodiment the collector includes "extender oil" in which at least one second collector is used to reduce the required dosage of at least one other more expensive collector.

In at least one embodiment the emulsifier comprises at least one of the surfactants described in the scientific textbook *Emulsions: Theory and Practice*, $3^{rd}$ Edition, by Paul Becher, Oxford University Press, (2001).

In at least one embodiment the surfactant is at least one item selected from the list consisting of: ethoxylated sobitan esters (such as Tween 81 by Sigma Aldrich), soy lecithin, sodium stearoyl lactylate, DATEM (Diacetyl Tartaric Acid) Ester of Monoglyceride), surfactants, detergents, and any combination thereof.

Any one, some or all of the constituents of the composition may be added to the slurry simultaneously or in any possible sequential order. Any one, some, or all of the items can be pre-mixed together before being added to the slurry medium. The slurry medium can be any liquid including but not limited to water, alcohol, aromatic liquid, phenol, azeotropes, and any combination thereof. Optionally the items can include one or more other additives.

EXAMPLES

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

Coal slurries were taken from two separate locations. The samples originate from flotation circuits. Representative examples of glycerides and fatty acid extract bearing compositions were identified as TX16220 and 015, and were dosed to the slurries. TX16220 is the extract in the form of an emulsion. Samples were filtered and moisture levels were measured. The two additives were compared to the control where no additive was added. Dosages of the two additives are listed. The tables below illustrate the present invention reduced moisture levels ranging from 3% to 20% in the first case. In the second case percent moisture reduction was as high as 9 percent.

Sample From Location #1

|  | Dosage (lb/t) | Time (seconds) | | | Weight (grams) | | | | | Moisture (percentage) | | Throughput (kilogram kg/hr/m2) |
| --- | --- | --- | --- | --- | --- | --- | --- | --- | --- | --- | --- | --- |
|  |  | CFT | DCT | CFT + DCT | T | T + W | T + D | Wnet | Dnet | Moisture (%) | Reduction(%) |  |
| Control | 0 | 85 | 120 | 205 | 4.18 | 49.07 | 38.19 | 44.89 | 34.01 | 24.24 | 0 | 135.26 |
|  | 0 | 76 | 120 | 196 | 4.19 | 46.14 | 35.96 | 41.95 | 31.77 | 24.27 | 0 | 132.15 |
|  | 0 | 88 | 120 | 208 | 4.18 | 48.42 | 36.78 | 44.24 | 32.6 | 26.31 | 0 | 127.78 |
| TX16220 | 0.5 | 85 | 120 | 205 | 4.18 | 50.28 | 39.76 | 46.1 | 35.58 | 22.82 | 8.49 | 141.50 |
|  | 1 | 59 | 120 | 179 | 4.16 | 45.9 | 36.62 | 41.74 | 32.46 | 22.23 | 10.85 | 147.84 |
|  | 3 | 45 | 120 | 165 | 4.19 | 45.84 | 37.6 | 41.65 | 33.41 | 19.78 | 20.67 | 165.08 |
|  | 5 | 39 | 120 | 159 | 4.25 | 46.92 | 38.27 | 42.67 | 34.02 | 20.27 | 18.71 | 174.44 |
| O15 | 0.5 | 70 | 120 | 190 | 4.16 | 46.35 | 36.26 | 42.19 | 32.1 | 23.92 | 4.10 | 137.74 |
|  | 1 | 73 | 120 | 193 | 4.26 | 47.91 | 37.43 | 43.65 | 33.17 | 24.01 | 3.73 | 140.12 |
|  | 3 | 69 | 120 | 189 | 4.17 | 45.47 | 36.19 | 41.3 | 32.02 | 22.47 | 9.90 | 138.12 |
| Control Ave |  |  |  | 203 |  |  |  |  |  | 24.94 |  |  |

Sample From Location #2

|  | Dosage (lb/t) | Time (seconds) | | | Weight (grams) | | | | | Moisture (percentage) | | Throughput (kilogram kg/hr/m2) |
| --- | --- | --- | --- | --- | --- | --- | --- | --- | --- | --- | --- | --- |
|  |  | CFT | DCT | CFT + DCT | T | T + W | T + D | Wnet | Dnet | Moisture (%) | Reduction(%) |  |
| Control | 0 | 93 | 120 | 213 | 4.2 | 43.14 | 32.91 | 38.94 | 28.71 | 26.27 | 0 | 109.89 |
|  | 0 | 102 | 120 | 222 | 4.19 | 44.99 | 34.42 | 40.8 | 30.23 | 25.91 | 0 | 111.02 |
|  | 0 | 132 | 120 | 252 | 4.16 | 48.96 | 36.94 | 44.8 | 32.78 | 26.83 | 0 | 106.05 |
| TX16220 | 0.5 | 96 | 120 | 216 | 4.22 | 46.79 | 35.55 | 42.57 | 31.33 | 26.40 | −0.26 | 118.25 |
|  | 1 | 85 | 120 | 205 | 4.24 | 44.36 | 34.23 | 40.12 | 29.99 | 25.25 | 4.13 | 119.27 |
|  | 3 | 63 | 120 | 183 | 4.22 | 44.24 | 34.01 | 40.02 | 29.79 | 25.56 | 2.94 | 132.72 |
|  | 5 | 51 | 120 | 171 | 4.21 | 42.25 | 33.14 | 38.04 | 28.93 | 23.95 | 9.07 | 137.93 |
| O15 | 0.5 | 96 | 120 | 216 | 4.16 | 44.12 | 33.61 | 39.96 | 29.45 | 26.30 | 0.13 | 111.16 |
|  | 1 | 105 | 120 | 225 | 4.19 | 45.88 | 35.05 | 41.69 | 30.86 | 25.98 | 1.36 | 111.82 |
|  | 3 | 74 | 120 | 194 | 4.22 | 41.42 | 31.81 | 37.2 | 27.59 | 25.83 | 1.91 | 115.95 |
| Control Ave |  |  |  | 229 |  |  |  |  |  | 26.34 |  |  |

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of separating a first material from a second material, comprising:
   mixing the first material and the second material in a slurry with a dewatering composition, wherein the dewatering composition comprises an extract from an ethanol process, the extract comprising at least one glyceride and fatty acid, and wherein one of the first material or second material is water,
   wherein the dewatering composition further comprises a collector, the collector being a sulfur containing material selected from the group consisting of xanthates, xanthogen formates, thionocarbamates, dithiophosphates, dithiophosphate sodium salt, dithiophosphate zinc salt, mercaptans, mercaptobenzothiazole, ethyl octylsulfide, and any combination thereof.

2. The method of claim 1, wherein the slurry comprises an ore containing a member selected from the group consisting of copper, gold, silver, iron, lead, nickel, cobalt, platinum, zinc, coal, barite, calamine, fledspar, fluorite, heavy metal oxides, talc, potash, phosphate, iron, graphite, kaolin clay, bauxite, pyrite, mica, quartz, sulfide ore, complex sulfide ore, non-sulfide ore, and any combination thereof.

3. The method of claim 1, wherein the process is a direct flotation process.

4. The method of claim 1, wherein the process is a reverse flotation process.

5. A method of separating a first material from a second material, comprising:
   collecting floatable sellable particles;
   dewatering the collected particles with a flotation process using a dewatering composition, wherein the dewatering composition comprises an extract from an ethanol process, the extract comprising at least one glyceride and fatty acid,
   wherein the dewatering composition further comprises a collector, the collector, being a sulfur containing material selected from the group consisting of xanthates, xanthogen formates, thionocarbamates, dithiophosphates, dithiophosphate sodium salt, dithiophosphate zinc salt, mercaptans, mercaptobenzothiazole, ethyl octylsulfide, and any combination thereof.

* * * * *

UNITED STATES PATENT AND TRADEMARK OFFICE
CERTIFICATE OF CORRECTION

PATENT NO. : 10,384,958 B2
APPLICATION NO. : 14/610095
DATED : August 20, 2019
INVENTOR(S) : Bo L. Tran et al.

Page 1 of 1

It is certified that error appears in the above-identified patent and that said Letters Patent is hereby corrected as shown below:

In the Specification

In Column 1, Line 9, delete "8,955.685" and insert -- 8,955,685 --, therefor.

In Column 1, Line 9, delete "Feb. 17." and insert -- Feb. 17, --, therefor.

In the Claims

In Column 12, Claim 2, Line 19, delete "fledspar," and insert -- feldspar, --, therefor.

In Column 12, Claim 5, Line 36, delete "collector," and insert -- collector --, therefor. (second occurrence)

Signed and Sealed this
Twenty-sixth Day of November, 2019

Andrei Iancu
*Director of the United States Patent and Trademark Office*